Dec. 15, 1942.   A. G. FRAZER-NASH   2,305,524
ARTICULATING PIPE JOINT
Filed Oct. 29, 1940
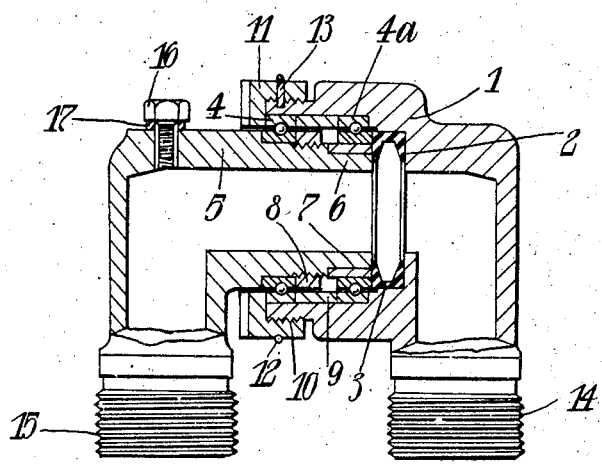
Inventor
A. G. Frazer-Nash
By Glascock Downing Seebold
Attys.

Patented Dec. 15, 1942

2,305,524

UNITED STATES PATENT OFFICE 2,305,524

ARTICULATING PIPE JOINT

Archibald Goodman Frazer-Nash, Tolworth, England

Application October 29, 1940, Serial No. 363,376
In Great Britain December 4, 1939

4 Claims. (Cl. 285—97.9)

This invention relates to articulating pipe joints of the spigot and socket type, in which between the spigot and socket elements there are located ball or like bearing elements, in association with a U-shaped packing ring for securing a fluid-tight seal.

One feature of the invention consists in the employment of a plurality of ball or roller bearings between the spigot and socket elements for taking up axial thrust, facilitating rotational motion and maintaining the two elements in alignment.

For instance, in accordance with the invention, within the socket element and between it and the spigot element there are located a plurality of ball bearings, the inner ball race of at least one of which co-operates with an abutment provided on the spigot element, while the outer ball race engages an abutment associated with the socket element in taking axial thrust.

This abutment may be formed on a member secured to the socket element in any convenient manner.

Thus, the member in question may be provided with an internally screw-threaded surface adapted to engage a correspondingly externally screw-threaded surface on the socket element.

The member in question may be secured to the socket element in any other convenient manner as, for instance, by providing a flange on the socket element and a flange on the member which may be secured to the first-mentioned flange by screw-threaded elements.

A further feature of the invention consists in the employment of a sealing ring of a U-shaped or channel cross-section having the limbs of the U directed inward from the periphery of the ring.

Thus, in accordance with the invention, such a sealing ring may be engaged between oppositely disposed seating surfaces provided within the socket element and on the spigot element.

For instance, the end of the spigot element may constitute or form part of such a seating surface.

One construction in accordance with the invention, comprising both of the above-mentioned features, is illustrated by way of example in the accompanying drawing of the construction.

The inner extremity of the socket element 1 is formed with a seating 2 for a sealing ring or washer 3 of U-shaped cross-section and is so dimensioned as to accommodate two ball bearings 4 and 4a arranged about the spigot element 5, the end 6 of which is arranged to form an abutment for one of the flanges of the sealing ring or washer, while the inner race of the ball bearing 4a adjacent to the end of the socket likewise bears upon this flange.

On the spigot element there is provided a bearing sleeve 7 against which the inner surface of the ball race in question will contact.

On the spigot element there is also provided a collar 8 in screw-threaded engagement with it and forming an abutment for and means for securing in position the inner race of ball bearing 4.

Between the outer races of the said ball bearings and within the socket element there is located a distance piece or distance collar 9, while the external surface of the socket element is screw-threaded at 10 and is engaged by the internal screwed surface of a nut element 11 which operates to secure from axial movement the two ball bearings and thus also the spigot element.

This nut element is furnished especially with a groove in which is engaged a spring ring 12 the ends of which extend through holes in it and engage in recesses in the end of the socket element, one of the ends being indicated by the reference 13.

In the construction illustrated the spigot and socket elements are cranked and are provided with screw-threaded portions 14 and 15, respectively, to enable them to be connected with lengths of pipe, and in a hole in the spigot element there is engaged a bleed screw 16 in association with a washer 17 for permitting the escape of air which may collect in the joint.

In conclusion it may be pointed out that swivelling pipe joints in accordance with the invention, while they preferably comprise the two features above referred to, may include only one of such features.

I claim:

1. An articulating pipe joint of the class described including a socket member having a shoulder provided therein, a spigot member rotatably mounted within the socket member and having one end disposed adjacent the shoulder, a packing ring substantially U-shaped in cross section seated against the shoulder and bearing against the adjacent end of the spigot member, ball bearings including races arranged between the members and respectively adjacent the inner end of the spigot member and the outer end of the socket member, and a spacing collar disposed between the races and means on said spigot and socket members acting to prevent axial movement of the ball bearings.

2. An articulating pipe joint of the class described including a socket member having a shoulder provided therein, a spigot member rotatably mounted within the socket member and having one end disposed adjacent the said shoulder, a packing ring substantially U-shaped in cross section seated against the shoulder and bearing against the adjacent end of the spigot member, ball bearings including spaced races arranged between the members and respectively adjacent the inner end of the spigot member and the outer end of the socket member, abutments provided on both of the members, an inner ball race cooperating with the abutment provided on the spigot member while an outer ball race engages the abutment associated with the socket member in absorbing axial thrust, the spigot member being externally threaded to accommodate the corresponding abutment which is in the form of a threaded collar for contacting the inner race of the adjacent ball bearing.

3. An articulating pipe joint comprising in combination, a socket member and a spigot member, an annular recess at the inner extremity of the socket member, a sealing ring of U-shaped or channel cross-section seated in said recess, an enlarged bore in the socket member accommodating two spaced ball bearings arranged about said spigot member, a reduced portion on the end of the spigot member, a bearing sleeve mounted thereon, the inner race of one bearing mounted on the sleeve and providing, with the sleeve, an abutment for one flange of the sealing ring, a shoulder on the spigot member providing an abutment for the inner race of the second bearing, means secured on the spigot member securing the bearing in position, a spacing member between the outer races of the bearings and means secured to the socket member providing an abutment and securing the assembly from axial movement, the two bearings being arranged for taking up axial thrust, facilitating rotational motion and maintaining the spigot and socket elements in alignment.

4. An articulating pipe joint comprising in combination a socket member, and a spigot member, an annular recess at the inner extremity of the socket member, a sealing ring of U-shaped or channel cross-section seated in said recess, an enlarged bore in the socket member accommodating two, spaced ball bearings arranged about said spigot member, a reduced portion on the end of the spigot member, a bearing sleeve mounted thereon, the inner race of one bearing mounted on the sleeve and providing with the sleeve an abutment for one flange of the sealing ring, a shoulder on the spigot member providing an abutment for the inner race of the second bearing, a collar member threadedly engaging the spigot member securing said race in position against said abutment, a spacing sleeve between the outer races of said bearings and a nut element having an inwardly extending flange providing an abutment for said races and spacing sleeve, and securing the assembly against axial movement, the two bearings being arranged for taking up axial thrust, facilitating rotational motion, and maintaining the spigot and socket members in alignment.

ARCHIBALD GOODMAN FRAZER-NASH.